Aug. 8, 1933.   P. A. S. IVERSEN   1,921,161
TRAILER BRAKE
Original Filed March 21, 1928   2 Sheets-Sheet 1
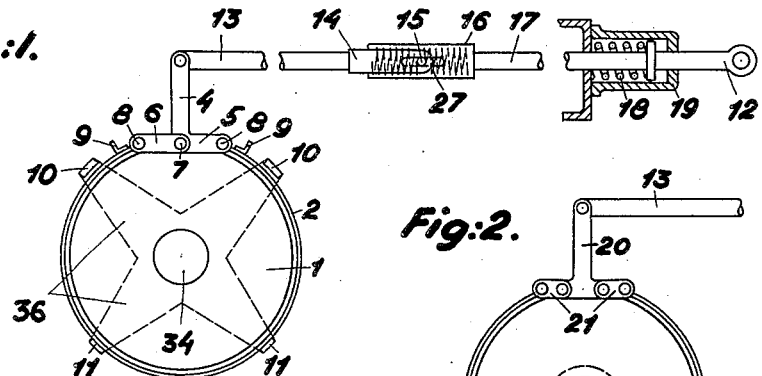
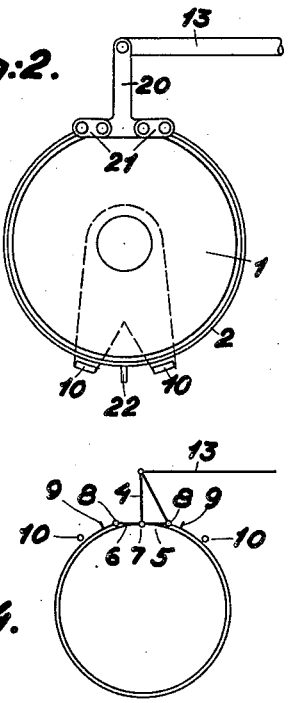
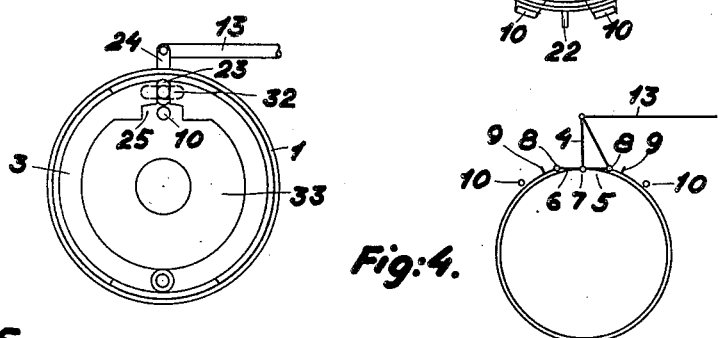
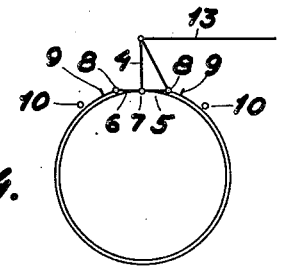
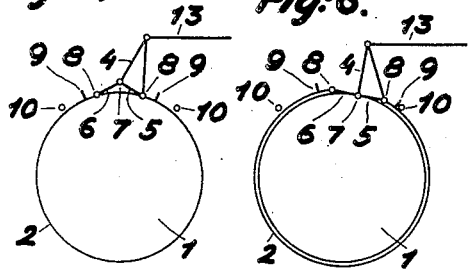
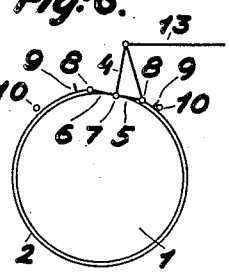
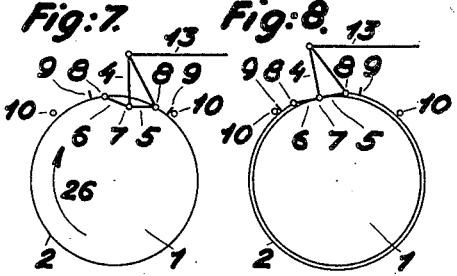
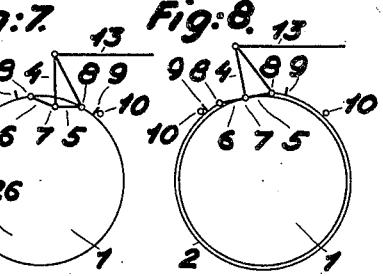
Inventor:
P. A. S. Iversen
By Emil Bönnelycke
Attorney

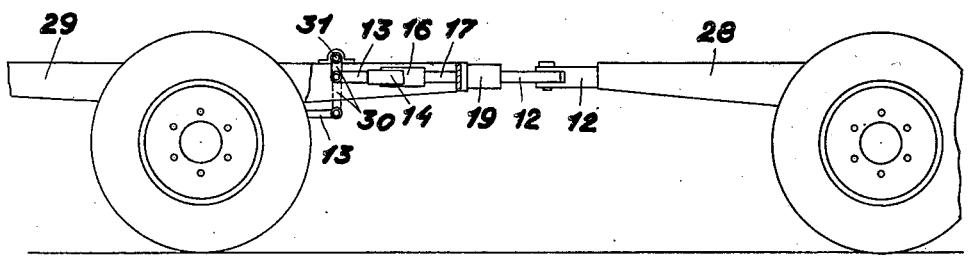
Fig: 9.
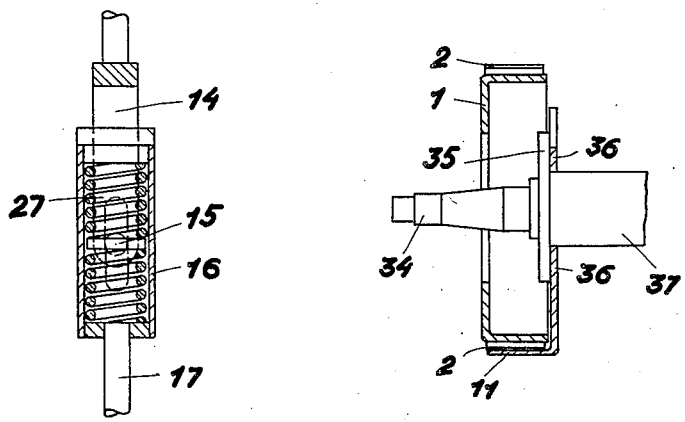
Fig:10.   Fig:11.

Patented Aug. 8, 1933

1,921,161

UNITED STATES PATENT OFFICE 1,921,161

TRAILER BRAKE

Poul Arne Scott Iversen, Copenhagen, Denmark, assignor to Bendix Brake Company, Chicago, Ill, a Corporation of Illinois Application March 21, 1928, Serial No. 263,327, and in Denmark March 28, 1927. Renewed February 25, 1932

12 Claims. (Cl. 188—112)

The invention relates to an automatically acting brake for trailer cars.

The brake consists of a braking device arranged loosely around the brake drum and consisting of a braking member (band or cheeks) and a brake-applying member (brake lever with associated links, toggle etc.) which may be oscillated as a unit about the brake drum between fixed stops, without any braking being thereby effected, while the brake-applying member may be turned relatively to the braking member, whereby the latter will be set into operation; the said oscillating and turning movements being imparted to the device by way of a system of tension rods interconnecting the brake-applying member and the resilient coupling of the trailer to the vehicle or main car.

In the drawings three constructions of brakes according to the invention are illustrated.

Figs. 1 to 3 show these three constructions in side elevation, and

Figs. 4 to 8 show, diagrammatically, various positions of the construction shown illustrated in Fig. 1.

Fig. 9 is a side elevation of the rear portion of a main car or vehicle to which is attached a trailer car;

Figs. 10 and 11 are views showing details.

First the construction shown in Fig. 1 will be described. Here a brake band 2 is laid around the brake drum 1, and is adapted to be pressed against the brake drum by means of a brake-applying member consisting of a bell-crank lever having two arms 4 and 5 to which a link 6 is hinged by means of a pin 7. The arm 5 and the link 6 are connected, by means of bolts 8, to the two ends of the brake band 2.

To the brake band two tappets 9 are attached. Two stops 10 or the like are further provided, which are fixed relatively to the underframe of the car, and which are adapted to be struck by the tappets 9 and to determine the angle through which the entire braking device may oscillate.

In order that the band 2 may not rattle during the driving, it may be supported by two guiding blocks 11 which are likewise stationary relatively to the underframe of the car. This construction is shown in Fig. 11, in which the casing 37 for the axle 34 has fixed to it a flange 35 supporting arms 36 terminating at the guide blocks 11, thus securing these elements in fixed position relative to the chassis.

The arm 4 of the brake-applying member is connected, by means of a system of tension rods, to the coupling 12 of the trailer, the said parts being interconnected by means of a rod 13 terminating in a fork 14 provided with a cross pin 15 which passes through a spring casing 16 attached to the end of another rod 17.

The coupling 12 is actuated by a duplex spring arrangement 18 (Fig. 10), in such a manner that it will be tensioned both when pulley and when pushed. The movements of the coupling 12 are limited by a casing 19 wherein the spring 18 is disposed.

In the spring casing 16 there is provided a spring 27 tending to oppose the movement of the pin 15, in forward as well as in rearward direction; this device being illustrated on an enlarged scale in Fig. 10.

In the construction shown in Fig. 2, there is used a brake-applying member consisting of a three-armed lever 20 connected to the brake band 2 by means of two links 21. Here only one single tappet 22 is used, which is free to move between the stops 10.

In the construction shown in Fig. 3, internal brake cheeks 3 are used as braking members and are applied by means of a cam 23 adapted to rotate between the cheeks which are inserted loosely in the brake drum. The motion is here limited by a stop 10 adapted to cooperate with notches 25 in the brake cheeks. The cam 23 is here operated by means of an arm 24 which is connected to the rod 13 and, hence, to the coupling 12.

The three illustrated constructions of brakes act mainly in one and the same manner. In the following the operation of the brake shown in Fig. 1 will be explained.

Supposing, at first, the two coupled vehicles to be at a standstill; then the individual parts of the brake will occupy the position shown diagrammatically in Fig. 4, with the arm 4 extending vertically upward, and the arm 5 and the link 6 in line with one another, the arms 4 and 5 being shown in Figs. 4—8 in the form of a triangle to indicate that they are integral, and move as a unit. Hence, the distance between the bolts 8 will be as great as possible, and the brake band will be slack.

If now the main vehicle commences to advance, it will pull on the coupling 12, and the latter will be drawn forward until it strikes the casing 19, by way of which the pull is transmitted to the underframe of the trailer. The displacement of the coupling 12 is transmitted through the rods 17 and 13 to the arm 4 which will occupy the position shown in Fig. 5, where the arm 5 and the link 6 now form an angle with one another and, consequently, have tightened the brake band with a force determined by the tension of the spring 27 in the spring casing 16. When, therefore, the trailer commences to move forward, the brake drum 1 will carry the braking device along. During this motion the free end of the arm 4 which is connected to the rod 13 will remain stationary. The brake band, however, can only be carried along by the brake drum so far as the stops 9 and 10 allow. When these stops strike one another, the brake band will not be carried along any further and, at the same time, as shown by Fig. 6, the arm 5 and the link 6 will now again be in line with one another, so that the brake band becomes slack again, and the brake does not prevent the movement of the trailer. Hence, this position is the normal position of the brake for forward motion.

If now the main vehicle or tractor reduces its speed, then the trailer, owing to its inertia, will approach the same. In consequence thereof, the coupling 12 will move inward and, by way of the rods 17 and 13, this motion will be imparted to the arm 4 which subsequently will occupy the position shown in Fig. 7, where the arm 5 and the link 6 once more form an angle with one another and, consequently, the brake band is tightened again. The brake drum retains the direction of rotation indicated by the arrow 26, so that the stops 9 and 10 are continuously kept pressed against one another. This is the braking position of the brake for forward motion.

Supposing now that the main vehicle, after this first braking, again moves forward at full speed, then the rods 13 and 17 will again bring the brake into the normal position shown in Fig. 6.

If on the other hand the main vehicle gradually stops entirely, and commences to travel backward, then the braking device, which continues to occupy the position shown in Fig. 7, will be carried along by the brake drum 1, the direction of motion of which is now reversed, until the stops 9 and 10 disposed on the opposite side strike one another and prevent any further motion, and at the same time the arm 5 and the link 6 once more come in line with one another, whereafter the brake will occupy the normal position for rearward travel shown in Fig. 8. In backing, the coupling 12 acts to compress the spring 18 against a portion of the frame of the trailer car 29 adjacent thereto and the enlarged portion of the coupling 12 acts against the casing 19 to thereby transmit backing force to the under-frame of the trailer car 29.

It will be seen that the brake thus automatically brakes for forward as well as for rearward driving, and that it follows accurately the varying motions of the main vehicle, braking when the latter reduces its speed, and releasing the brake drum when the main vehicle travels at high speed, either forward or backward.

As in the construction shown in Fig. 2, the three-armed lever, when swung by pulling the rod 13, will cause the links 21 to occupy a zigzag position, whereby the band 2 will be pressed against the drum 1. Hence, it is obvious that by pulling the rod 13 in either direction, the drum will carry the band along until its movement is stopped by the tappet 22 striking one of the stops 10. Thereafter, the lever 20 will occupy a position corresponding to the position shown in Fig. 6, if the car is traveling forward, or in Fig. 8, if the car is traveling backward. In these positions, the braking will be effected in the same manner, as described in connection with Figs. 4—8 when the main car retards its movement.

When, in the position represented in Fig. 3, the rod 13 is pulled in either direction, the lever 24 will be swung, and the cam 23 will press the cheeks 3 against the inner surface of the drum 1. The latter will, therefore, move the cheeks along in its rotation and lever 24 will be turned in a slot 32 in the shield plate 33. The cheeks can only be moved until the stop 10 strikes one of the notches 25 in the cheeks, whereupon lever 24 will be placed radially relatively to the drum, and the cam will release the cheeks from the drum, so that the brake is placed in the position for normal travel, corresponding to the positions shown in Figs. 6 and 8, respectively. When now the lever 24 is operated because the main car retards its movement, braking will take place, because the cam 23 in such cases will press the cheeks against the drum.

The system of rods shown in Fig. 1 and connecting the arm 4 to the coupling 12 will not be sufficient, in practice, to produce the desired effect, since the movement of the coupling 12 is too short to do so. For this reason levers must be inserted causing the motion which is imparted to the arms 4, 5 to become several times greater than the motion performed by the coupling 12.

A construction of this character is shown in Fig. 9 where the main car 28 is coupled to the trailer car 29 by the coupling 12. The rod 13 is divided in two parts interconnected by a lever 30 which is fulcrumed at 31 on the chassis of the trailer car. The two parts of the rod 13 are rotatably connected with the lever 30, the part directly connected with the fork 14 being nearer the fulcrum 31 than the part 13 connected with the brake levers 4, 20 or 24, so that the motion of this latter part will be increased.

It will be evident that the invention is not limited to the constructions shown on the drawings, since the merely workman-like aspect of the case may be carried out in many ways.

What I claim as new is:

1. An automatically-acting brake for trailers, comprising a brake drum; a braking element cooperative therewith; a spring-pressed coupling rod between the main vehicle and the trailer; and a brake-applying lever connected on one side to said coupling rod and on the other side directly to said braking element in a manner to enable said lever and braking element to follow the rotation of the brake drum in either direction through a predetermined angle.

2. A brake according to claim 1, in which coacting means are provided on the braking element and the under frame of the trailer to limit the extent of the angle of rotation of the lever and braking element.

3. A brake according to claim 1, in which coacting tappets are provided on the braking element for engagement with fixed stops on the under frame of the trailer to limit the extent of the angle of rotation of the lever and braking element.

4. An automatically-acting brake for trailers, comprising a brake drum; a braking element cooperative therewith; a spring-pressed coupling rod between the main vehicle and the trailer; a brake-applying lever connected on one side to said coupling rod and on the other side directly to said braking element in a manner to enable said lever and braking element to follow the rotation of the brake drum in either direction through a predetermined angle; and a motion-amplifying device interposed between the coupling rod and the brake-applying lever to transmit the movement of the former to the latter.

5. An automatically-acting brake for trailers, comprising a brake drum; a braking element cooperative therewith; a spring-pressed coupling rod between the main vehicle and the trailer; a brake-applying lever connected on one side to said coupling rod and on the other side directly to said braking element in a manner to enable said lever and braking element to follow the rotation of the brake drum in either direction through a predetermined angle; and a motion-amplifying device interposed between the coupling rod and the brake-applying lever to transmit the movement of the former to the latter; said amplifying device including a pair of slidably-connected rods, and a spring tending to oppose the sliding movement of said rods.

6. A brake according to claim 5, in which one of the slidably-connected rods embodies a casing wherein the spring is disposed.

7. An automatically-acting brake for a trailer which is adapted to be moved by a towing vehicle, comprising a brake drum on the trailer; a braking element cooperative therewith; and means, effective upon the deceleration of said towing vehicle both from forward motion and rearward motion for automatically moving said braking element into contact with said brake drum.

8. An automatically-acting brake for a trailer which is adapted to be moved by a towing vehicle, comprising a rotatable brake drum on the trailer; connections between said towing vehicle and said trailer; and means effective upon the stopping of said towing vehicle from movement whether in a forward direction or in a rearward direction, for retarding the rotation of said brake drum, said means comprising a rotatable friction element having spaced ends and adapted to be moved into contact with said brake drum, means for limiting the rotative movement of said friction element in both directions, a pair of pivoted links connected to said spaced ends, and means connecting said pivoted links with said towing vehicle.

9. An automatically-acting brake for a trailer which is adapted to be moved by a towing vehicle, comprising a rotatable brake drum on the trailer; a rotatable friction element adapted to be moved into contact with said drum and formed with spaced ends; means for limiting the rotative movement of said friction element in both directions; a bell crank lever pivotally connected to one said end of said friction element, a link pivotally connected to the other end of said friction element and to said bell crank lever; and connections between said bell crank lever and said towing vehicle.

10. An automatically-acting brake for a trailer which is associated with a towing car, comprising a rotatable brake drum on the trailer, a friction element associated therewith and rotatable with said drum in both directions, means for limiting the amount of rotation of said element in each direction, and means for applying said friction element to said drum comprising a link connected to said towing car and a lever connected at one point to said link and at another point operatively associated with said friction element in such a manner that the lever together with the friction element can rotate with the brake drum in either direction through a limited predetermined angle.

11. Braking mechanism for a trailer which is adapted to be moved by a towing vehicle, comprising a rotatable drum, a rotatable friction element formed with spaced ends and adapted to be moved into contact with said drum, a pair of stops for limiting the rotative movement of said friction element, a bell crank lever attached to one end of said friction element, a link attached to the other end of said friction element, and means connecting said bell crank lever and said link with said towing vehicle.

12. Braking mechanism for a trailer which is adapted to be moved by a towing vehicle, comprising a rotatable brake drum, a rotatable friction element adapted to be moved into contact with said drum and having spaced ends, a pair of links pivotally connected to said spaced ends, a lever connected to both of said links and connections extending between said lever and said towing vehicle.

POUL ARNE SCOTT IVERSEN.